Oct. 14, 1924.

D. F. McCLINTOCK

PISTON

Filed April 18, 1922

1,511,414

Inventor

D. F. McClintock

By

Lany Lacey, Attorneys

Patented Oct. 14, 1924.

1,511,414

UNITED STATES PATENT OFFICE.

DAVID FRANK McCLINTOCK, OF JACKSON, TENNESSEE.

PISTON.

Application filed April 18, 1922. Serial No. 554,982.

*To all whom it may concern:*

Be it known that I, DAVID F. McCLINTOCK, a citizen of the United States, residing at Jackson, in the county of Madison and State of Tennessee, have invented certain new and useful Improvements in Pistons, of which the following is a specification.

This invention relates to an improved piston for internal combustion engines and seeks, as one of its principal objects, to provide a piston so constructed that pumping of oil by the piston into the combustion chamber of an engine cylinder will be minimized.

The invention has as a further object to provide a piston wherein excess oil scraped from the cylinder wall will be returned through the wall of the piston to the engine crank case.

And the invention has as a still further object to provide a piston embodying a ring peculiarly constructed to scrape excess oil from the wall of the cylinder and direct such oil into a channel upon the piston to be drained from said channel through the wall of the piston.

Other and incidental objects will appear hereinafter.

Figure 1:
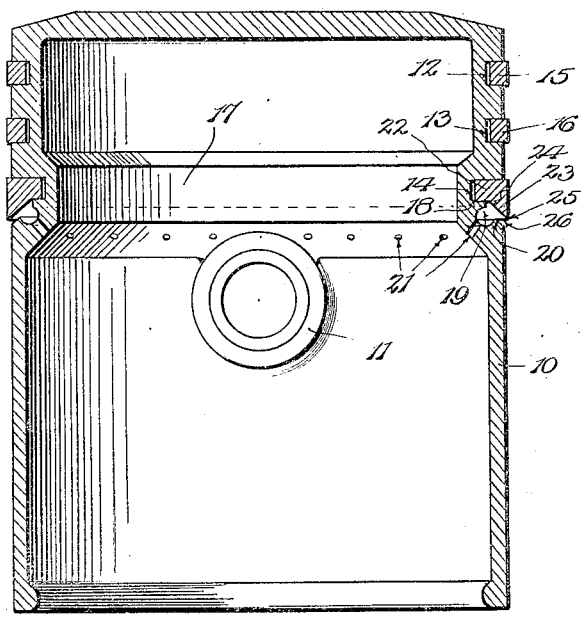
Figure 1 is a vertical sectional view of my improved piston.

In carrying the invention into effect, I employ a piston shell 10 which is provided with appropriate wrist pin bearings 11 and formed in the upper end portion of the shell are ring grooves which, for convenience, have been indicated at 12, 13 and 14, respectively. The grooves 12 and 13 are the counterpart of each other and mounted in said grooves is an upper ring 15 and an intermediate ring 16, these rings being of any appropriate design. At the ring groove 14, the shell is formed with an internal annular boss 17 and, as will now be observed, said groove is provided with a shortened bottom wall 18 beneath which the boss is formed with an obliquely disposed annular oil channel 19 facing upwardly and outwardly toward the periphery of the shell. From said channel, the shell is thence provided with an outwardly and downwardly beveled face 20 spaced below the bottom wall of the groove and extending between the channel and the periphery of the shell. Leading from said channel 19 through the boss 17 is a plurality of circumferentially spaced drain passages 21 inclining downwardly and inwardly from the channel to the interior of the shell.

Figure 2:
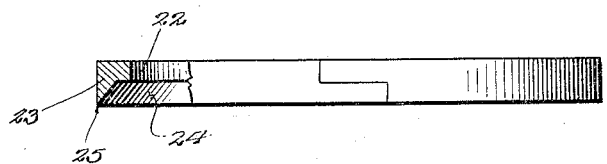
Figure 2 is a detail elevation of the scraping ring of the piston, partly broken away and shown in section.

Mounted in the ring groove 14 of the shell 10 is a scraping ring 22. As most clearly shown in Figure 2, this ring is provided with flat upper and lower faces but the lower face of the ring is, however, shortened to coact with the shortened bottom wall 18 of the ring groove and formed in said ring at its outer margin is a depending V-shaped annular scraping flange 23. This flange lies flush at its outer side with the periphery of the ring and thus serves to increase the effective width of the peripheral working face of the ring while at its inner side said flange is formed with an outwardly and downwardly beveled face 24 sloping downwardly away from the flat bottom face of the ring to define a sharp annular scraping edge 25 at the periphery of the ring. As shown in Figure 1, the beveled face 24 of said flange lies substantially parallel to the beveled face 20 of the shell to define an intervening annular oil passage 26 leading beneath the ring to the channel 19 of the shell.

As will now be readily understood in view of the preceding description, when the piston moves downwardly within its cylinder, the scraping edge 25 of the ring 22 will scrape any excess oil from the wall of the cylinder which excess oil will be directed through the passage 26 beneath the ring into the channel 19. Then, when the piston moves upwardly, the oil in this channel will be forced through the drain passages 21 into the shell to thence flow back into the crank case. Accordingly, oil will be prevented from working beneath and behind the ring 22 to rise thereover and finally find its way into the combustion chamber of the cylinder so that oil flooding of the cylinder will be effectually overcome.

Having thus described the invention, what is claimed as new is:

In a piston, the combination of a shell formed at its outer side with a ring groove and below the ring groove with a cylindrically-shaped oil groove spaced inwardly from the periphery of the shell and provided with a drain opening through the wall of the shell, the shell being formed between the mouth of said groove and the periphery of the shell with an inclined face, and a ring mounted in the ring groove and formed at its lower side with a tapered depending annular scraping flange having an inclined lower face overhanging the oil groove to confront said inclined face of the shell and form an oil passage leading upwardly from the periphery of the shell to the mouth of the oil groove, the oil groove being tilted with respect to the longitudinal axis of the shell to retain oil therein as well as to dispose the outer side wall of the oil groove to curve upwardly toward the inclined lower face of said scraping flange away from the mouth of said oil passage whereby oil following up the inclined face of the flange and precipitated downwardly into the oil groove will be again directed by the outer wall of said oil groove upwardly against said inclined face of the flange away from the mouth of the passage, the inclined face of said scraping flange confronting the inclined face of the shell in close spaced relation whereby said passage is restricted for checking the discharge of oil therethrough.

In testimony whereof I affix my signature.

DAVID FRANK McCLINTOCK. [L. S.]